(12) United States Patent
Morandeau et al.

(10) Patent No.: US 9,849,521 B2
(45) Date of Patent: Dec. 26, 2017

(54) CUTTING TOOL FOR FACE MILLING COMPOSITE MATERIAL, CORRESPONDING METHOD OF FACE MILLING, CUTTING INSERT AND TOOL BODY

(71) Applicants: Antoine Morandeau, Tours (FR); David Bonhoure, Luynes (FR); René Leroy, Joue-les-Tours (FR)

(72) Inventors: Antoine Morandeau, Tours (FR); David Bonhoure, Luynes (FR); René Leroy, Joue-les-Tours (FR)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 835 days.

(21) Appl. No.: 14/097,347

(22) Filed: Dec. 5, 2013

(65) Prior Publication Data
US 2014/0161544 A1    Jun. 12, 2014

(30) Foreign Application Priority Data
Dec. 7, 2012    (EP) .................................... 12306549

(51) Int. Cl.
*B23C 5/06*    (2006.01)
*B23C 5/20*    (2006.01)
(Continued)

(52) U.S. Cl.
CPC .................. *B23C 5/06* (2013.01); *B23C 3/13* (2013.01); *B23C 5/006* (2013.01); *B23C 5/207* (2013.01); *B23C 5/22* (2013.01); *B23C 2200/205* (2013.01); *B23C 2200/208* (2013.01); *B23C 2200/367* (2013.01); *B23C 2210/086* (2013.01);
(Continued)

(58) Field of Classification Search
CPC .......... B23C 5/06; B23C 5/006; B23C 5/207; B23C 5/22; B23C 3/10; B23C 2200/208
See application file for complete search history.

(56) References Cited

U.S. PATENT DOCUMENTS 3,550,107 A * 12/1970 Thompson ............. B23Q 15/12
                                                    340/680
4,743,144 A *  5/1988 Shikata ................... B23C 5/207
                                                    407/113
(Continued)

FOREIGN PATENT DOCUMENTS

CN           1599654 A      3/2005
DE        10230452 A1      1/2004
(Continued)

*Primary Examiner* — Will Fridie, Jr.
(74) *Attorney, Agent, or Firm* — Corinne R. Gorski

(57) ABSTRACT

A cutting tool for face milling includes insert pockets for the fixing of cutting insert. The cutting inserts can be fixed in the insert pockets, wherein the cutting inserts and insert pockets are designed such that, when the cutting inserts are fixed within the corresponding insert pocket, each cutting insert presents: a primary and a secondary cutting edge. The intersection between the primary and the secondary cutting edge of one cutting insert being axially inwardly and radially outwardly offset from the intersection between the primary and the secondary cutting edge of another cutting insert. A lead angle defined between the primary and the secondary cutting edges is less than 30°.

13 Claims, 4 Drawing Sheets

(51) Int. Cl.
  *B23C 3/13*   (2006.01)
  *B23C 5/00*   (2006.01)
  *B23C 5/22*   (2006.01)

(52) U.S. Cl.
  CPC .. *B23C 2210/285* (2013.01); *B23C 2210/287* (2013.01); *B23C 2226/27* (2013.01); *Y10T 407/192* (2015.01); *Y10T 407/1908* (2015.01); *Y10T 407/235* (2015.01); *Y10T 409/303808* (2015.01)

(56) References Cited

U.S. PATENT DOCUMENTS

| | | | | |
|---|---|---|---|---|
| 4,844,666 A * | 7/1989 | Tsujimura | | B23C 5/003 407/34 |
| 6,413,023 B1 * | 7/2002 | Nagashima | | B23C 5/2221 407/113 |
| 7,399,146 B2 * | 7/2008 | Long, II | | B23C 5/006 407/33 |
| 8,523,497 B2 * | 9/2013 | Uno | | B23C 5/06 407/113 |
| 8,708,616 B2 * | 4/2014 | Smilovici | | B23C 5/06 407/113 |
| 8,851,810 B2 * | 10/2014 | Ishi | | B23C 5/006 407/34 |
| 8,979,447 B2 * | 3/2015 | Bozkurt | | B23C 5/06 407/113 |
| 2014/0161545 A1 * | 6/2014 | Inagaki | | B23B 27/1603 407/42 |

FOREIGN PATENT DOCUMENTS

| | | |
|---|---|---|
| FR | 2894497 A3 | 6/2007 |
| WO | 9816341 A1 | 4/1998 |
| WO | 2008084469 A1 | 7/2008 |
| WO | 2011107594 A1 | 9/2011 |

* cited by examiner

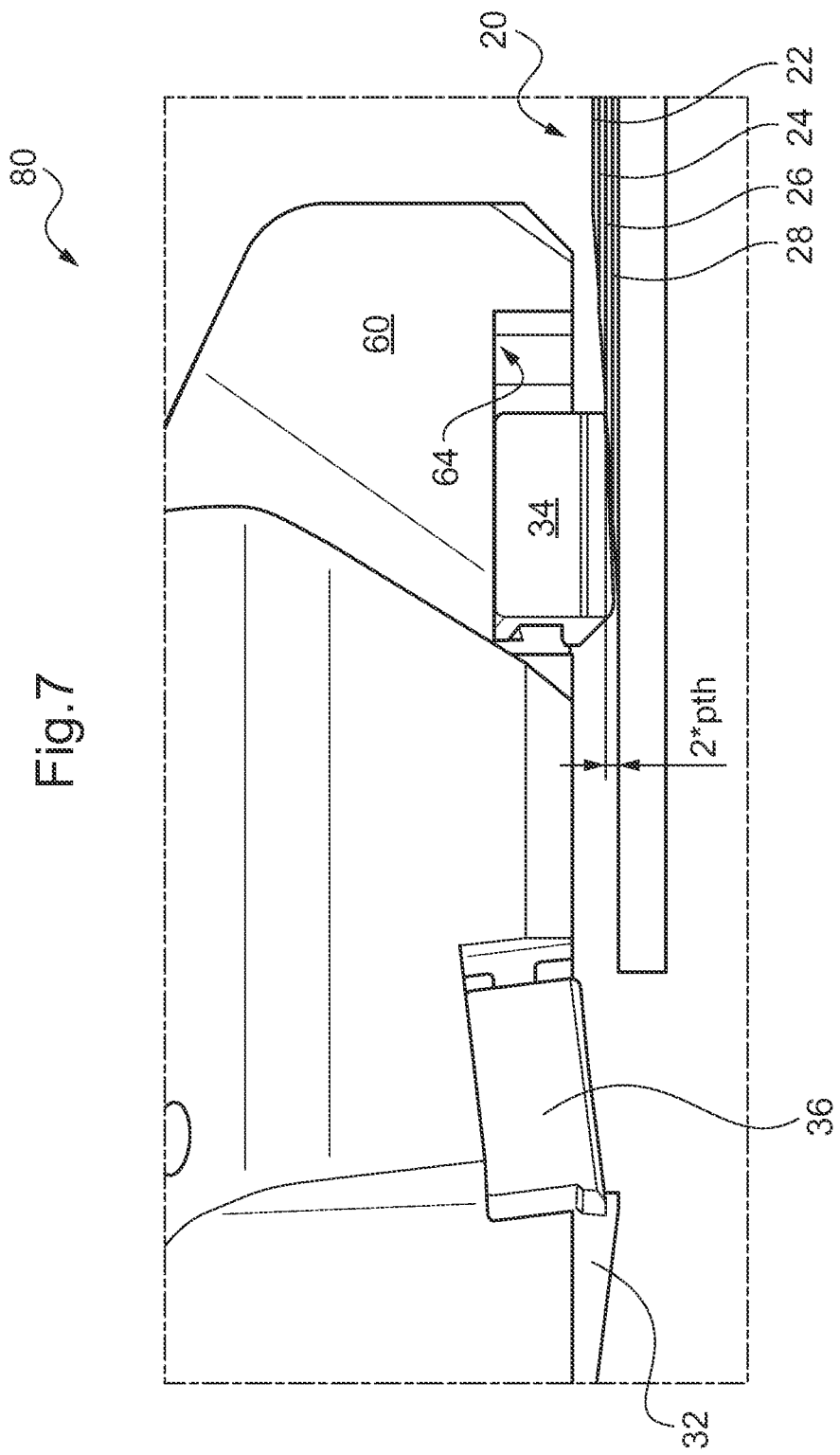

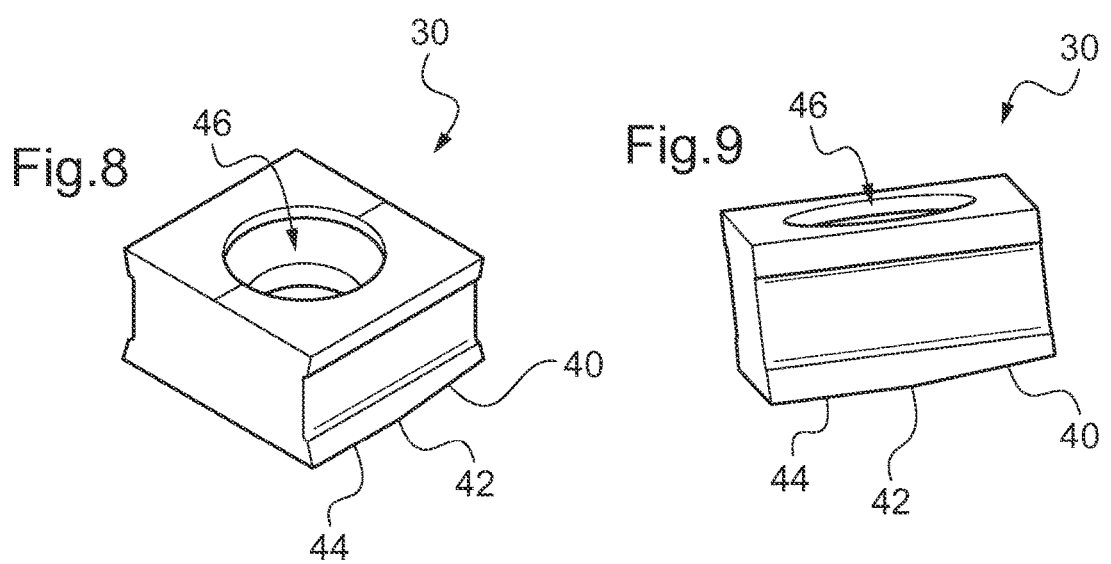
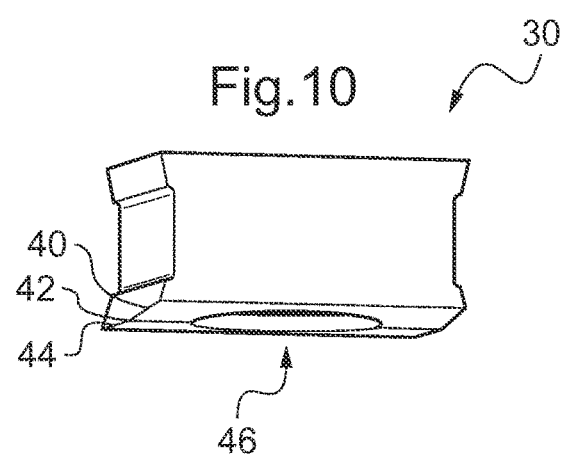
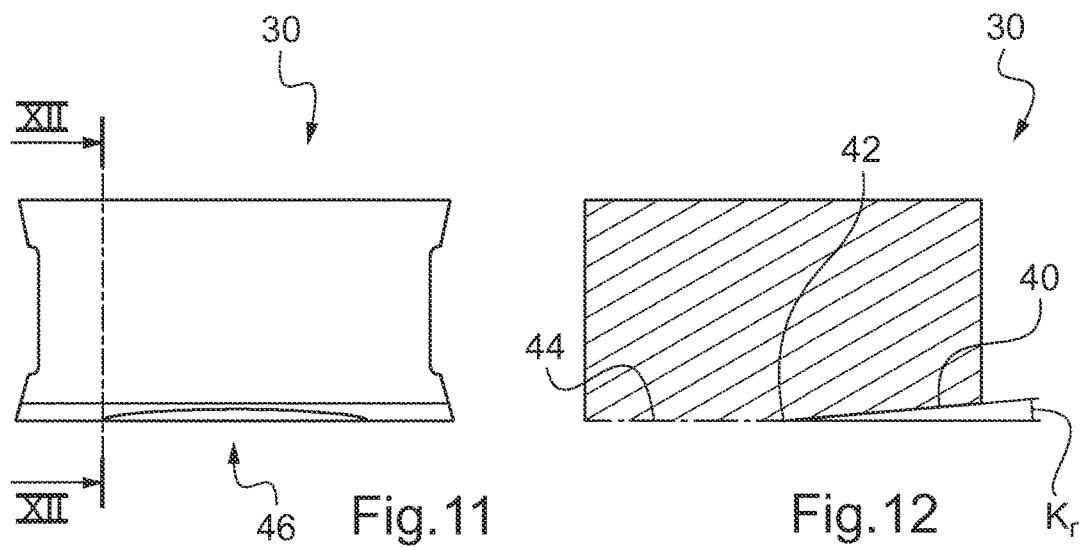

CUTTING TOOL FOR FACE MILLING COMPOSITE MATERIAL, CORRESPONDING METHOD OF FACE MILLING, CUTTING INSERT AND TOOL BODY

RELATED APPLICATION DATA

This application claims priority under 35 U.S.C. §119 to EP Patent Application No. 12306549.2, filed on Dec. 7, 2012, which the entirety thereof is incorporated herein by reference.

SUMMARY

The present disclosure relates to a cutting tool and to a method for face milling a work piece, notably in composite material. This disclosure also relates to a corresponding appropriate cutting insert and to a corresponding appropriate tool body.

Composite materials are known to be inhomogeneous materials. Indeed, composite materials most often consist of two distinct phases. The first phase is composed of reinforcement fibers, notably carbon or glass fibers. These fibers are relatively hard and brittle. Further, these fibers result from an assembly of different plies, each ply having its own unidirectional orientation regarding the fibers within. FIG. 1 shows a schematic exploded view of the plies 22, 24, 26 and 28 composing a known composite material 20. If the orientation of the fibers of ply 28 is taken as the reference for orientation (orientation of fibers within the ply 28 equal to 0°), fibers of plies 22, 24, 26 are respectively oriented with an angle of 45°, 90°, and 135°.

The second phase of a composite material is composed of a polymer resin matrix which bonds the fibers within each ply and the fibers from one ply to another ply. This matrix is soft and ductile. Back to FIG. 1, the composite 20 after bonding of the plies is called a multi-axial laminate because reinforcement fibers can be orientated as needed.

Composite parts are notably manufactured by molding process, milling or drilling steps. The inhomogeneity of composite material, here anisotropy, creates some severe challenges regarding machining. Common defects that may occur during machining of these composite materials are delamination, overheat of the resin, uncut fibers, and fiber pull-out.

People in the field often experience a trade-off between two main problems; on one hand, maintaining the composite part integrity and quality, and on the other hand, reducing the wear of the cutting tools.

However, notably within the aeronautic technical field, the quality level required in machining imposes a higher quality cut of machined parts. This is particularly the case regarding the preparation of a surface of the composite material which will be used for clamping a metallic part or before a composite to composite bonding process.

Accordingly, the present disclosure aims to offer a method and a cutting tool for face milling which allows face milling of better quality when used on a composite laminate.

This object is achieved with a cutting tool for face milling a work piece perpendicular to the axis of the cutting tool, the cutting tool including:
  a tool body comprising a first and a second insert pocket each for the fixing of one cutting insert;
  a first and a second cutting insert able to be fixed in the first and second insert pockets respectively, first and second cutting inserts and insert pockets being designed such that, when first and second cutting inserts are fixed within the corresponding insert pocket, each cutting insert presents:
    a primary cutting edge for radial machining of the work piece,
    a secondary cutting edge associated to the primary cutting edge, the secondary cutting edge being a wiper edge for axial machining of the work piece, the intersection between the primary cutting edge and the secondary cutting edge of the second cutting insert being axially inwardly and radially outwardly offset from the intersection between the primary cutting edge and the secondary cutting edge of the first cutting insert; and
    a lead angle of each cutting inserts defined between the primary and the secondary cutting edge being lower than 30°.

The disclosure further proposes that the tool body includes:
  a plurality of insert pockets including the first and second insert pockets;
  a plurality of cutting inserts including the first and second cutting inserts, each cutting insert of the plurality being able to be fixed in one corresponding insert pocket of the plurality of insert pockets, the plurality of cutting inserts and the plurality of insert pockets being designed such that, when each cutting insert is fixed within the corresponding insert pocket, each cutting insert presents:
    a primary cutting edge for radial machining of the work piece;
    a secondary cutting edge associated to the primary cutting edge, the secondary cutting edge being a wiper edge for axial machining of the work piece;
  where the intersection between the primary cutting edge and the secondary cutting edge of the plurality of the insert pockets are offset one to another by being disposed along a conical helix around the axis of the cutting tool;
  a lead angle of each cutting inserts between the primary and the secondary cutting edge being the same;
  the cutting inserts are all the same in size and shape, the insert pockets being axially and radially offset one to another;
  at least two radially and axially offset insert pockets are disposed on the tool body, such that the primary cutting edges of the cutting inserts, when respectively fixed in these insert pockets, present a common axial overlap;
  the first insert pocket is the most axially outward insert pocket of the tool body; the second insert pocket is the insert pocket the least axially offset from the first insert pocket among the insert pockets of the tool body being axially offset from the first insert pocket; the axial offset between the first and second insert pockets being greater by about 0.06 mm;
  the cutting inserts and insert pockets of the cutting tool are designed such that, when fixed in their corresponding insert pocket, the cutting inserts are disposed on a same conical helix with the same axial offset greater or equal to 0.1 mm, preferably about 0.2 mm, and lower than or equal to 0.5 mm, the same axial offset being most preferably about 0.26 mm;
  the cutting inserts have a central bore for fixing in the corresponding insert pocket of the tool body by a substantially axial screw;
  the lead angle is comprised within 3° and 12°, preferably about 5°;
  the cutting inserts are each fixed in their corresponding insert pocket of the tool body so that the lead angle between the primary cutting edge for radial machining of the work piece and the secondary cutting edge for axial machining of the work piece is the same for each of these cutting inserts.

The disclosure further proposes a method for face milling a work piece, the method comprising:

a step of face milling the work piece with the previous cutting tool, the radial feed per tooth of the cutting tool with respect to the work piece obeying the inequality:

$$Fz \leq d_r - \frac{d_a}{\tan(K_r)}$$

where: Fz is the radial feed per tooth;
dr is the radial offset between two consecutive offset cutting inserts;
da is the axial offset between two consecutive offset cutting inserts;
Kr is the lead angle of the cutting inserts.

Preferred embodiments of the method are defined in the dependent claims. The disclosure further proposes that:

before the step of face milling, the method includes:

a step of choosing the work piece to be face milled, the work piece being chosen to be made of composite material;

in the step of choosing the work piece, the work piece is chosen to be made of composite material comprising a plurality of plies, the thickness of at least one ply to be machined during the step of face milling of the work piece being equal to the axial offset between two consecutive offset cutting inserts;

the radial feed per tooth is chosen about but not more than the optimum feed according to the below equation:

$$Fz_{max} = d_r - \frac{p_{th}}{\tan(K_r)}$$

where Fzmax is the optimum radial feed pet tooth;
dr is the radial offset between two consecutive offset cutting inserts;
pth is the ply thickness of the composite material to be machined;
Kr is the lead angle of the cutting inserts.

Furthermore, the disclosure proposes a cutting insert, for face milling a work piece, the cutting insert having a central bore for fixing in a corresponding insert pocket of a face milling tool body, the cutting insert being designed such that, when fixed within the corresponding insert pocket of the face milling tool body with a screw through the bore and substantially parallel to the axis of the tool body, the cutting insert presents:

a primary cutting edge for radial machining of the work piece;
a secondary cutting edge associated to the primary cutting edge, the secondary cutting edge being a wiper edge for axial machining of the work piece,
the lead angle between the primary and the secondary cutting edge being lower than about 30°.

Besides, the disclosure proposes a tool body for face milling a work piece perpendicularly to the axis of the tool body, the tool body including:

a first insert pocket for housing a cutting insert, the first insert pocket being the most axially outward insert pocket of the tool body;

a second insert pocket for housing a cutting insert, the second insert pocket being the insert pocket the less axially offset from the first insert pocket among the insert pockets of the tool body being axially offset from the first insert pocket, the second insert pocket being also radially outwardly offset from the first insert pocket; and the axial offset of the second insert pocket with respect to the first insert pocket being greater by about 0.06 mm.

Further features and advantages will appear from the following description of the embodiments, given as non-limiting examples, with reference to the accompanying drawings listed hereunder.

BRIEF DESCRIPTION OF THE DRAWINGS

FIG. 7 is a magnified view of FIG. 6 at the cutting insert machining the composite material.

FIGS. 8, 9, 10 are perspective views of a cutting insert appropriate for machining composite materials.

FIGS. 11 and 12 are a side view and a cross-sectional view thereof of the cutting insert of FIGS. 8 to 10.

DETAILED DESCRIPTION

The disclosure proposes a cutting tool or milling cutter for face milling a work piece by chip removing machining of the work piece. The milling cutter is of the known type that comprises a basic body rotatable in a predetermined direction around a center axis and having a front end surface and an envelope surface that extends axially backward from the front end surface and is concentric with the center axis. The milling cutter further includes a number of cutting inserts, which are mounted in peripherally spaced-apart pockets. The cutting inserts individually include an upper side, an under side and at least one clearance surface, which, together with the upper side, delimits cutting edges.

Figure 2:
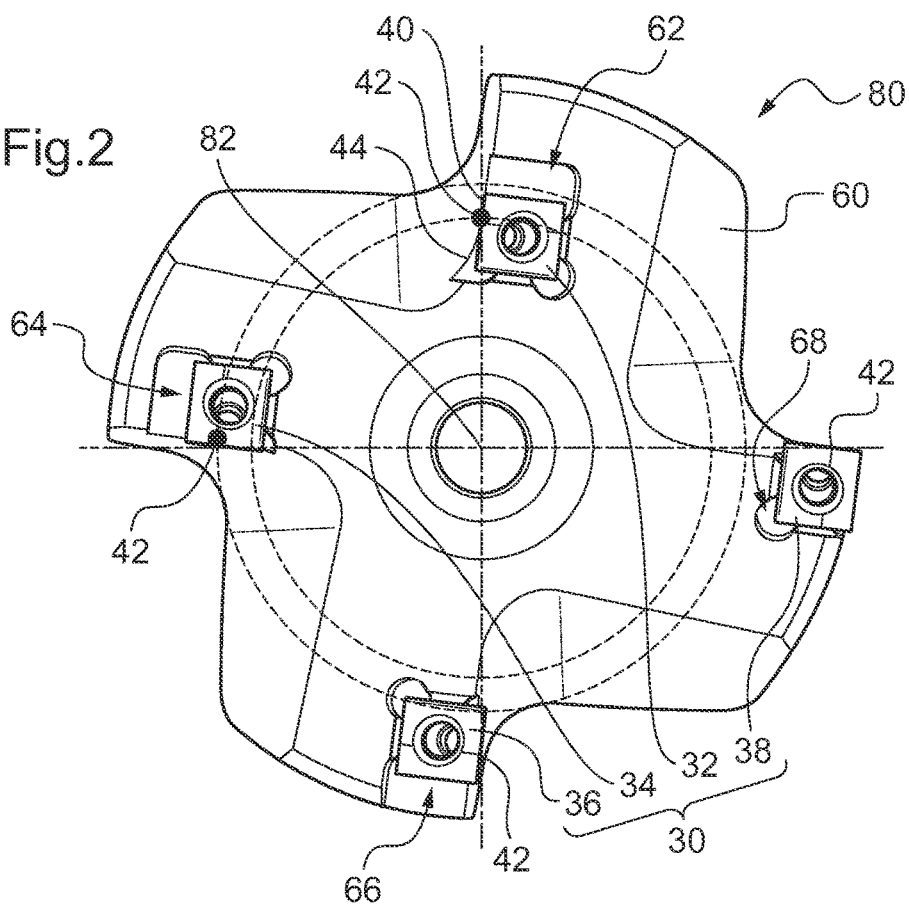
FIG. 2 is a schematic bottom view of a cutting tool formed of a tool body with fixed cutting inserts having axial and radial offsets.

FIG. 2 shows, in a bottom view, the cutting tool 80 including a tool body 60 as the basic body rotatable around its center axis 82, and four cutting inserts 30 fixed therein.

These cutting inserts 30 are, here, all the same. However, the tool body 60 comprises various insert pockets 62, 64, 66 and 68, each defining a particular fixing position for each cutting insert 30. Thus, the cutting inserts 30 are distinguished with reference signs 32, 34, 36 and 38 depending on the insert pocket into which each is fixed, 62, 64, 66 and 68, respectively. In this document, the use of the reference signs 32, 34, 36, 38, respectively, instead of the reference sign 30 is to be understood as a reference to the cutting insert 30 fixed in the corresponding insert pocket 62, 64, 66, 68, respectively. Accordingly, the cutting inserts 30 having all the same geometric shape and size, discussions about the position of each of the cutting inserts 32, 34, 36, 38 refer also to their fixing position defined by their corresponding insert pocket 62, 64, 66, 68 as well as to the position of their corresponding insert pocket 62, 64, 66, 68 in the tool body 60.

The cutting inserts 32, 34, 36, 38 are disposed circumferentially around the axis 82 of the tool body 60. In this document the terms "radial" and "axial" are used in reference to the axis 82 of the tool body 60, which is also the axis of the cutting tool 80. Accordingly, the cutting inserts 32, 34, 36, 38 are disposed with a radial offset from one to another. Cutting insert 32 is the cutting insert 30 disposed most radially inwardly, the reference signs 34, 36, 38 of a cutting insert 30 increasing with an increase of the radial offset of the cutting insert 30 from the cutting insert 32. Cutting insert 38 is thus the cutting insert 30 disposed most radially outwardly.

Figure 3:
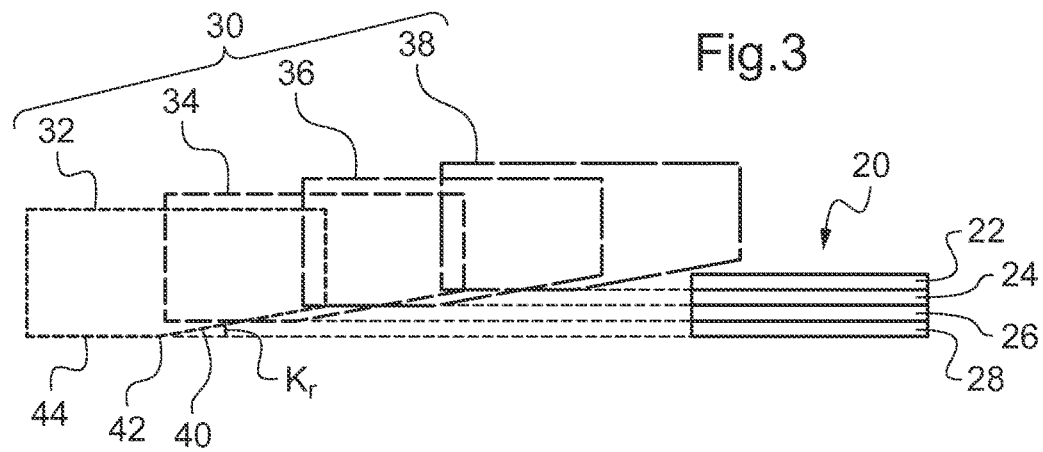
FIG. 3 is a schematic cross-sectional side view superposing in the same angular plane cutting inserts fixed in the cutting tool according to FIG. 2.

Further the cutting inserts 32, 34, 36, 38 are also disposed with an axial offset from each other. FIG. 3 shows a sectional side view of the cutting inserts 32, 34, 36, 38 as fixed in the tool body 60 of FIG. 2, but with a fictitious superposition in the same angular plane around the axis 82 of the cutting tool 80. This view shows the axial offset of the cutting inserts 32, 34, 36 and 38 together with the above described radial offset. Cutting insert 32 is the most axially outwardly fixed of the cutting inserts 30, the term "outward" being used in reference to the exterior of the tool body 60, herein corresponding to the downward direction in FIG. 3. The other cutting inserts 34, 36, and 38, are gradually axially inwardly offset from the cutting insert 32.

The radial and axial offsets of the cutting inserts 30 can be seen, in their fixing position, on the cutting edges 40 and 44. Each cutting insert 32, 34, 36, 38 presents a primary cutting edge 40. In the fixing position and as shown in FIG. 3, the primary cutting edge 40 of each cutting insert 32, 34, 36, 38 produces a radial machining of a work piece 20. Further each cutting insert 32, 34, 36, 38 presents a secondary cutting edge 44 associated with the primary cutting edge 40. In the fixing position and as shown in FIG. 3, the secondary cutting edge 44 of each cutting insert 32, 34, 36, 38 produces an axial machining of the work piece 20. The secondary cutting edge is consequently a wiper edge associated to the primary cutting edge 40. The phrases "primary cutting edge" and "secondary cutting edge" here correspond to the working cutting edges in the fixing position of the cutting insert. However, the described cutting inserts may also include cutting edges, which could be a primary cutting edge and a secondary cutting edge respectively, depending on how each cutting insert is fixed in its respective insert pocket. In other words, the cutting inserts may be indexable. In the fixing position of the cutting inserts 32, 34, 36, 38, the axially inwardly and radially outwardly offsets could notably be noticed on the intersection 42 between the primary cutting edge 40 and the secondary cutting edge 44 of each cutting insert 30.

Intersection 42 is defined as the point where the tangent at the end of the primary cutting edge 40 meets the tangent at the end of the secondary cutting edge 44. Accordingly, the intersection 42 is defined independently from the radius of curvature of the junction between the primary cutting edge 40 and the secondary cutting edge 44, a radius which is nevertheless less than 3000 mm. Comparison of intersections 42 have been particularly discussed herein, but other characteristic points of the cutting inserts could also be compared to notice the axial and radial offsets of the cutting inserts 32, 34, 36, 38.

The plurality, for example, four, of cutting inserts 30 are offset so that the intersections 42 are offset one to another by being disposed along a conical helix around the axis 83 of the tool body 60. Accordingly, intersections 42 shown in FIG. 3 are aligned.

All shown cutting inserts 30 being the same in size and shape, the cutting inserts 32, 34, 36, 38 are disposed in the cutting tool 60 along a conical helix around the axis 82 because of the disposition of their corresponding insert pocket 62, 64, 66, 68 along a conical helix. According to a not shown variant, the disposition along a conical helix around the axis 82 of the cutting inserts 30 in their fixing position could be obtained with cutting inserts (not shown) having a different size with respect one to another. According to this variant, the insert pockets of the cutting tool 60 are disposed so that the fixing of their respective cutting insert disposes the intersections 42 of each cutting insert along a conical helix around the axis 82.

The fixing in the tool body 60 of at least two axially inwardly and radially outwardly offset cutting inserts 30 among the plurality of cutting inserts 32, 34, 36, 38, is advantageous with respect to the use of a tool body having a single cutting insert or having multiple cutting inserts without axial offset. In others words, for the cutting tool 80, having the second cutting insert 30 being axially inwardly and radially outwardly offset from the first cutting insert 30, according to their fixing positions in the tool body 60, is advantageous with respect to known high feed milling cutters having multiple cutting inserts on the same radial and axial fixing position. In this document, the same radial and axial position should be understood taking account of the manufacturing tolerance of the insert pockets of a cutting tool, which could be of 25 μm. Accordingly, an "offset" in this document is considered to be greater than 0.025 mm.

Figure 1:
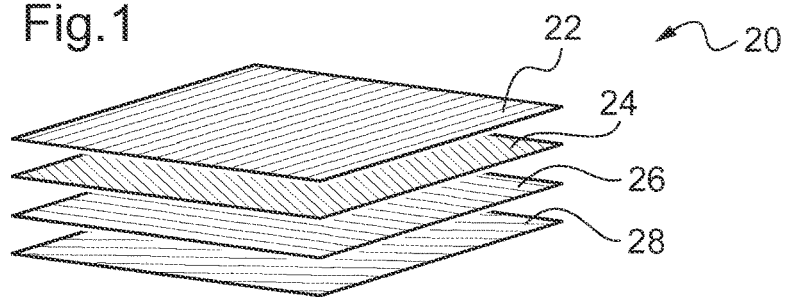
FIG. 1 is a schematic, exploded view of the plies composing a known composite material.
Figure 4:
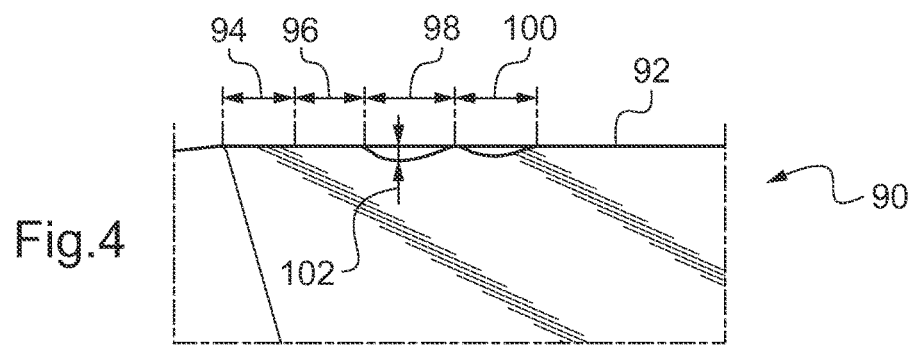
FIG. 4 is a side view of a known cutting insert used alone for the machining of the known composite material of FIG. 1.

This advantage can be seen on FIG. 4, which is a side view of a known cutting insert 90 used alone, or with other cutting inserts in the same radial and axial position, for face milling the known composite material of FIG. 1. After machining of the composite material, the cutting edge 92 of this cutting insert 90 presents various wear on the different parts 94, 96, 98, 100. The wear of part 98 is the most advanced with a 0.180 mm deep notch.

With the use of at least two axially inwardly and radially outwardly offset cutting inserts 30, the different parts presenting the various wear could be distributed on different cutting inserts 30. Here, the worn parts 98, 100 would have been distributed on the most axially inwardly and radially outwardly offset cutting insert among the first and second cutting inserts: i.e. the second cutting insert. On the contrary the unworn, or less worn, parts 94, 96, would have been distributed on the most axially outwardly and radially inwardly offset cutting insert among the first and second cutting inserts: i.e. the first cutting insert. In view of this distributed wear, the second cutting insert could be replaced whereas the first cutting insert could still be used for further machining work. The proposed cutting tool 80 thus allows to replace the cutting inserts that include the worn parts only, whereas each cutting insert 90 shown in FIG. 4 must be replaced although they include parts 94 and 96 that are not worn and could have been further used for machining.

To summarize, when machining with two axially inwardly and radially outwardly offset cutting inserts, each cutting insert should be replaced according to its proper wear, e.g. every N cycles of machining for the cutting insert with the most wear, every M (greater than N) cycles for the other one. On the contrary when machining with two cutting inserts at the same axial and radial position, both cutting inserts will have to be replaced every 2*N cycles, due to worn parts, despite unworn parts which are only worn after 2*M cycles. The proposed cutting tool thus results in a cutting tool having a lower general consumption of cutting inserts.

An even better distribution of the wear and consequently less cutting insert consumption can be obtained with more than two respectively axially inwardly and radially outwardly offset cutting inserts than with the above described tool body 60 having e.g. four axially inwardly and radially outwardly offset cutting inserts 32, 34, 36, 38. As described above, for more than two axially inwardly and radially outwardly offset cutting inserts, the plurality of cutting inserts of the cutting tool is preferably disposed along a conical helix around the axis 82 of the tool body 60.

The improvement brought about by the distribution of wear over different cutting inserts is particularly due to the anisotropy of the material. With an anisotropic material, the wear of the tool depends on the depth of cut of each cutting part of the tool during face milling. For example in the case of face milling the composite material of FIG. 1, the cutting part of the tool machining the ply 22 angled at 45° will not be worn similarly to the cutting part of the tool machining the ply 28 angled at 0°. For the cutting insert 90 of FIG. 4, the variation of the wear of four parts 94, 96, 98, 100 is due to the four various plies 22, 24, 26 and 28 that each part machines during the face milling of the composite material 20. Part 94 mostly only machines ply 28, part 96 mostly only machines ply 26, part 98 mostly only machines ply 24, and part 100 mostly only machines ply 22.

Consequently, with a known composite material to be machined, it is proposed a method of face milling using the cutting tool 80 where each axially offset cutting insert is dedicated to one ply, this ply being mostly the only ply that this cutting insert will machine during the face milling.

Figure 5:
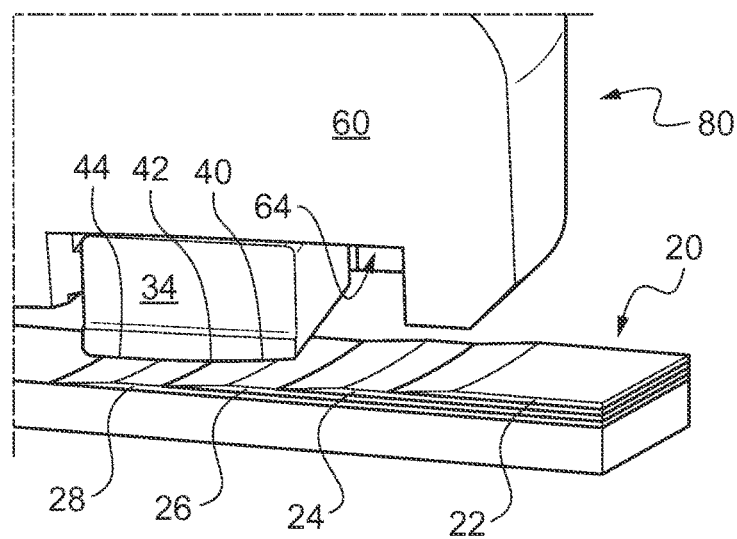
FIG. 5 is a cross-sectional perspective view of one of the cutting inserts of the cutting tool according to FIG. 3 machining the composite material.
Figure 6:
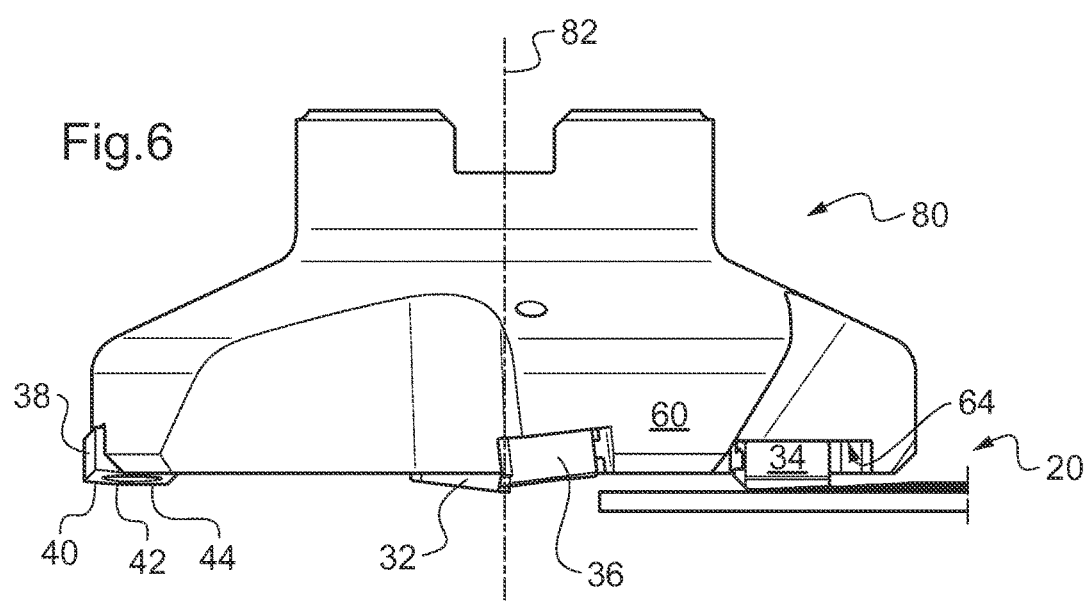
FIG. 6 is a lateral view of the cutting tool according to FIG. 5.

Accordingly, the number of axially inwardly and radially outwardly offset cutting inserts is preferably chosen to be equal or at least greater than the number of plies to be machined in the composite material. This feature assures that each axially offset cutting insert mostly machines only one or two corresponding plies, even if the axial offset is not chosen equal to the thickness of the ply to be machined. FIG. 5 shows a sectional perspective view of one of the cutting inserts of FIG. 3 machining the composite material 20. Here, the cutting insert 34 mostly machines only the ply 26 of the composite laminate 20. FIG. 6 shows a lateral view of the cutting tool 80 in the same position with respect to the work piece 20 as in FIG. 5.

Further, the axial offset between two consecutive offset cutting inserts 32 and 34, or 34 and 36, or 36 and 38, is preferably equal to the thickness of at least one of the plies 22, 24, 26 or 28 of the composite material. Regarding the equality between the axial offset of two consecutive cutting inserts and the thickness of a composite ply, this should be understood to more or less 10%, preferably to more or less 5%. In the case where the thickness of each ply is different, the axial offset of each cutting insert is preferably adapted so that the depth of cut of each insert corresponds to the thickness of the ply that is planned to be machined by the cutting insert. For simplicity of manufacturing, as well as for the machining of composite materials with the same thickness for each of its plies 22, 24, 26 and 28 as shown in FIG. 3, the axial offset of all consecutive cutting inserts is preferably chosen to be equal to the same value. In the following, the thickness of each ply is considered to be the same, as shown in FIGS. 3, 5 and 6 and is denoted pth. FIG. 7 shows a magnified view of FIG. 6 at the cutting insert 34 machining the ply 26 of the composite laminate 20. This magnified view shows that the axial offset between two consecutive cutting inserts is chosen to be equal to pth so that the axial offset between cutting inserts 32 and 36 is the double of pth.

In other words, for the proposed cutting tool 80, the axial offset between two consecutive cutting inserts is chosen for obtaining better distribution of the wear according to a characteristic depth corresponding to the average depth of variation of the mechanical properties of materials in general or of the particular material to be machined. For the proposed method of face milling and cutting tool, the choice of the axial offset thus completely differs from the choice of the axial offset of cutting inserts in the cutting tools known from e.g. U.S. Pat. No. 6,960,051 B2 and FR 2 894 497 A3.

In these documents, the axial offset between the cutting inserts is chosen to limit the occurrence of burr during face milling. With respect to the aim of limiting burr when machining metal, the axial offset of two consecutive offset cutting inserts should be chosen as low as possible. The axial offset between the most axially outwardly cutting insert and the second most axially outwardly cutting insert is particularly pertinent for limiting burr formation. Indeed, the most axially outwardly cutting insert is the cutting insert finishing the face milling whereas the second most axially outwardly cutting insert is the last cutting insert that machines before finishing. Accordingly, in this description a "finishing cutting insert" corresponds to a cutting insert whose wiper edge finishes the face milling of the work piece. As disclosed in FR 2 894 497 A3, the finishing cutting insert may not be alone and there may be a plurality of finishing cutting inserts, so that the second most axially outwardly cutting insert is to be understood as the most axially outward cutting insert apart from all the finishing cutting inserts. In other words, the second most axially outward cutting insert is the cutting insert that is the least axially offset from the finishing cutting insert among the cutting inserts of the tool body being axially offset from the finishing cutting insert.

In contrast, for the proposed method and cutting tool 80, the axial offset may be greater than about 0.06 mm, particularly regarding the axial offset between most axially outwardly cutting insert and the second most axially outwardly cutting insert. The axial offset could also be greater or equal to 0.1 mm, and preferably to about 0.2 mm. The axial offset could be limited to lower or equal to 0.5 mm notably to avoid over-heating of each cutting insert during machining, it being mentioned that the over-heat is here also limited by the distribution of the cutting work between the number of cutting inserts. Nevertheless and as described above, the axial offset is preferably the same between each consecutive cutting insert and more preferably equal to the thickness of a composite ply. Composite plies with carbon fibres are notably known to have a 0.26 mm thickness, so that the same axial offset is most preferably about 0.26 mm. In this document the word "about" should be understood, unless otherwise mentioned, as corresponding to more or less 10%, preferably more or less 5%.

The use of cutting inserts 30 with the same shape and size being preferred, the axial offset is entirely produced by the axial offset of the corresponding insert pocket 62, 64, 66 and 68 of the tool body 60. Accordingly as already mentioned, the above discussion regarding the various axial offset for the cutting inserts applies equally for the corresponding insert pocket of the tool body 60. It is therefore notably proposed a tool body 60, wherein the axial offset between the most axially outwardly insert pocket and the second most axially outwardly insert pocket is greater to about 0.06 mm. In others words, the axial offset between the finishing insert pocket and the insert pocket being the insert pocket that is the least axially offset from the finishing insert pocket among the insert pockets of the tool body being axially offset from the wiper insert pocket is greater than about 0.06 mm.

As a consequence of the above choice of the axial offset between two consecutive offset cutting inserts, the radial offset is chosen so that the cutting inserts are disposed, in the fixing position, along a conical helix as above-mentioned. This conical helix is chosen with respect to the lead angle Kr of the cutting inserts 30.

With reference to FIG. 3, the lead angle Kr is formed, in the fixing position, between the primary cutting edge 40 and the secondary cutting edge 44 of all cutting inserts 30. The lead angle Kr is chosen to be lower than 30°. Such a low lead angle limits the occurrence of flaw when machining the work piece 20 and results in a good finish of the work piece 20. In particular, when the work piece 20 is made of composite material as shown in FIGS. 1 and 3, the lead angle Kr lower than 30° limits the occurrence of flaking and of fibers pulling out. Further, the use of such a lower lead angle allows the formation of chips or cuttings, whereas a higher lead angle, as observed for 60°, forms small chips or even powder.

For a better result regarding the finish of the machining of particular materials like composite materials, the lead angle value is preferably chosen lower or equal to 12°, but greater or equal to 3° to limit the radial offset between the cutting inserts for tool balancing considerations. Experiments have been conducted with a particular lead angle Kr of 5°, without any fibers pulling out or flaking of the composite materials. The lead angle Kr is consequently most likely chosen about 5°, i.e. more or less 10%, preferably more or less 5%, being mentioned that the manufacturing tolerance is generally of 15 minutes of angle. With respect to the above mentioned documents U.S. Pat. No. 6,960,051 B2 and FR 2 894 497 A3, the proposed cutting tool 80 with the low lead angle Kr advantageously limits machining flaws occurring when face milling brittle materials like composite materials Back to FIG. 3, the angle of the conical helix on which the cutting inserts 30 are disposed, i.e. the angle of the line joining the intersections 42, is chosen to be lower than the same lead angle Kr of the cutting inserts 30. This choice allows to have radial feeds for which one cutting insert 30 always machines the work piece 20 before its consecutive more radially inwardly cutting insert 30. Here, the considered feed is the feed per tooth Fz (also designed "feed per cut") which corresponds to the feed per revolution Fn divided by the number of cutting inserts.

To that purpose the radial feed Fz should be chosen according to the following inequality:

$$Fz \leq d_r - \frac{d_a}{\tan(K_r)} \tag{1}$$

where Fz is the radial feed per tooth;
dr is the radial offset between two consecutive offset cutting inserts;
da is the axial offset between two consecutive offset cutting inserts;
Kr is the lead angle of the cutting inserts.

The optimum feed Fzmax for the face milling is the upper limit of the above inequality. This optimum feed is the fastest feed for face milling with the cutting tool before a more radially inwardly cutting insert 30 gets ahead of a more radially outwardly cutting insert 30. Accordingly, at the optimum feed, the plurality of cutting inserts 32, 34, 36 and 30 radially machines the work piece 20 along the same slanted straight line in the feed direction. For the face milling of composite materials, the optimum axial offset between two consecutive cutting inserts being equal to the thickness of each ply of composite, the optimum feed preferably obeys the below equation:

$$Fz_{max} = d_r - \frac{p_{th}}{\tan(K_r)} \tag{2}$$

where Fzmax is the optimum radial feed per tooth;
dr is the radial offset between two consecutive offset cutting inserts;
pth is the ply thickness of the composite material to be machined;
Kr is the lead angle of the cutting inserts.

To further optimize the face milling, the maximum chip thickness allowed by the material to be machined could be taken into account. This maximum chip thickness (hereafter Hmax) corresponds to the thickness of the chip beyond which the quality of the machining is reduced. The reduction of the quality of the machining results for composite in observed delaminations and flakings. This maximum chip thickness is obtained when the radial feed per revolution (Fn) of the proposed cutting tool 80 obeys to:

$$Fn = Z * Fz = \frac{H_{max}}{\sin(K_r)} \tag{3}$$

where Fn is the radial feed per revolution;
Z is the number of teeth for the cutting tool, i.e. the number of cuttings inserts;
Fz is the radial feed per tooth;
Hmax is the maximum chip thickness;
Kr is the lead angle of the cutting inserts.

As above mentioned the radial feed is also constraint by the inequality (1). Accordingly to be able to machine by removing the highest chip thickness, the radial offset preferably follows:

$$d_r \geq \frac{H_{max}}{\sin(K_r) * Z} + \frac{d_a}{\tan(K_r)} \tag{4}$$

where dr is the radial offset between two consecutive offset cutting inserts;
Hmax is the maximum chip thickness;
Z is the number of tooth for the cutting tool, i.e. the number of cuttings inserts;
Kr is the lead angle of the cutting inserts;
da is the axial offset between two consecutive offset cutting inserts.

As a consequence; the optimum machining by chip removing is obtained when above Fzmax can be chosen with the highest chip thickness Hmax, thus the radial offset (dr) for the optimum fastest chip removing of a composite material obeys to:

$$\frac{H_{max}}{\sin(K_r) * Z} = Fz_{max} = d_r - \frac{p_{th}}{\tan(K_r)} \tag{5}$$

where Fzmax is the optimum radial feed per tooth;

dr is the radial offset between two consecutive offset cutting inserts;

Hmax is the maximum chip thickness;

Z is the number of tooth for the cutting tool, i.e. the number of cuttings inserts;

Kr is the lead angle of the cutting inserts;

da is the axial offset between two consecutive offset cutting inserts.

For a composite made of carbon fibers and epoxy, the maximum chip thickness has been observed as being equal to 0.3 mm, so that Hmax of above equalities (3) and (5) and inequality (4) can be chosen about 0.3 mm.

This document particularly describes the face milling of composite materials. However, the axial distribution of the wear on different offset cutting inserts and the low lead angle is also proposed for machining all kinds of materials like anisotropic materials or even isotropic materials with probable local flaws. Yet the axial outwardly and radial inwardly offset cutting inserts 32, 34, 36 and 38 allows to have primary cutting edges 40 of consecutive cutting inserts which axially overlap. Accordingly, the failure of one of the overlapped cutting edges is counterbalanced by the overlapping cutting edges of the consecutive cutting inserts. This benefit could also be obtained with at least two radially and axially offset cutting inserts, e.g. 32 and 34, 34 and 36, 36 and 38, presenting a common axial overlap. These overlaps avoid the damaging of the material in the case of failure of one cutting edge of the cutting inserts, thereby protecting the health of the machined material and allowing continuing machining of the work piece 20 until the end of the machining cycle. As a consequence, the proposed cutting tool 80 and method of face milling are even beneficial for the face milling of a purely isotropic material.

It is also proposed an appropriate cutting insert allowing the face milling as above proposed with the cutting tool 80 and with the method of face milling. Such a proposed cutting insert 30 is shown in perspective views by FIGS. 9, 10 and 11. Further, FIG. 11 shows a side view of the cutting insert 30. FIG. 12 shows a cross-sectional view according to XII-XXI of FIG. 11. This cutting insert 30 corresponds to the above general description of cutting inserts 32, 34, 36, 38 described together with the cutting tool 80. Accordingly, this cutting insert 30 also presents the primary cutting edge 40, the secondary cutting edge 44 and their intersection 42, wherein the lead angle Kr is lower than about 30°, here 5°. Apart from these features deduced from the above general description, cutting insert 30 further includes a central bore 46 for fixing in a corresponding insert pocket of the tool body 60. As shown in FIG. 3, this central bore 46 is designed for a screw extending through bore 46 in the cutting insert 30 substantially parallel to the axis 82 of the tool body 60. The fixing of this cutting insert 30 with a screw substantially parallel to the axis 82 allows more simple and rapid manufacturing of the corresponding insert pocket of the tool body 60 than for an insert pocket (not shown) designed to receive a cutting insert with an orthoradial screw.

Although a limited number of embodiments and their components have been specifically described and illustrated herein, many modifications and variations will be apparent to those skilled in the art.

The cutting tool 80 has been described with only one conical helix on which the cutting inserts 32, 34, 36, 38 are disposed, however one or more supplementary conical helixes with supplementary cutting inserts could also be proposed for the cutting tool 80. A supplementary conical helix could be the same as the above described conical helix but disposed with an angular offset thereof. For this supplementary conical helix, the axial and radial position of its cutting insert may be chosen to correspond to the axial and radial position of each cutting inserts 32, 34, 36, and 38. Further, independently from the supplementary helixes, one or more supplementary wiper cutting inserts similar to cutting insert 32 may be foreseen to improve the finish of the face milling. For a further improvement the single or multiple wiper cutting inserts may be coated.

The invention claimed is:

1. A cutting tool for face milling a work piece perpendicularly to an axis of the cutting tool, the cutting tool comprising:
a tool body including at least a first and a second insert pocket each for the fixing thereto of one cutting insert;
at least a first and a second cutting insert each fixed in a respective first or second insert pocket, the first and second cutting inserts and insert pockets being arranged such that when the first and second cutting inserts are fixed within the respective insert pocket, each cutting insert presents a primary cutting edge for radial machining of the work piece; and
a secondary cutting edge associated with the primary cutting edge, the secondary cutting edge being a wiper edge for axial machining of the work piece, wherein an intersection between the primary cutting edge and the secondary cutting edge of the second cutting insert is axially inwardly and radially outwardly offset from an intersection between the primary cutting edge and the secondary cutting edge of the first cutting insert; and a lead angle, the lead angle of each cutting insert defined between the primary and the secondary cutting edge being less than 30°.

2. The cutting tool according to claim 1, wherein the tool body includes a plurality of insert pockets, and a plurality of cutting inserts, each of the plurality of cutting inserts being able to be fixed in a respective insert pocket of the plurality of insert pockets, the plurality of cutting inserts and the plurality of insert pockets being arranged such that when each cutting insert is fixed within the corresponding insert pocket each cutting insert presents a primary cutting edge for radial machining of the work piece; a secondary cutting edge associated with the primary cutting edge, the secondary cutting edge being a wiper edge for axial machining of the work piece, wherein the intersection between the primary cutting edge and the secondary cutting edge of the plurality of the insert pockets are offset one to another by being disposed along a conical helix around the axis of the cutting tool; and a lead angle, the lead angle of each cutting insert between the primary and the secondary cutting edge being the same.

3. The cutting tool according to claim 1, wherein the cutting inserts are all the same in size and shape, the insert pockets being axially and radially offset one to another.

4. The cutting tool according to claim 3, wherein at least two radially and axially offset insert pockets are disposed on the tool body such that the primary cutting edges of the cutting inserts, when respectively fixed in the offset insert pockets, present a common axial overlap.

5. The cutting tool according to claim 3, wherein the first insert pocket is the most axially outward insert pocket of the tool body, the second insert pocket is the insert pocket the least axially offset from the first insert pocket among the insert pockets of the tool body and being axially offset from the first insert pocket, the axial offset between the first and second insert pockets being greater by about 0.06 mm.

6. The cutting tool according to claim 1, wherein the cutting inserts and insert pockets are arranged such that when fixed in the respective insert pocket the cutting inserts are disposed on a same conical helix with the same axial offset greater than or equal to 0.1 mm, preferably about 0.2 mm, and lower than or equal to 0.5mm, the same axial offset being most preferably around 0.26 mm.

7. The cutting tool according to claim 1, wherein the cutting inserts have a central bore for fixing in the corresponding insert pocket of the tool body by a substantially axial screw.

8. The cutting tool according to claim 1, wherein the lead angle is within 3° and 12.

9. The cutting tool according to claim 1, wherein the cutting inserts are each fixed in the respective insert pocket of the tool body so that the lead angle between the primary cutting edge for radial machining of the work piece and the secondary cutting edge for axial machining of the work piece is the same for each of these cutting inserts.

10. A method for face milling a work piece, the method comprising the step of face milling the work piece with a cutting tool, the cutting tool including a tool body, the tool body having at least a first and a second insert pocket each for the fixing thereto of one cutting insert; and at least a first and a second cutting insert each fixed in a respective first or second insert pocket, the first and second cutting inserts and insert pockets being arranged such that when the first and second cutting inserts are fixed within the respective insert pocket each cutting insert presents a primary cutting edge for radial machining of the work piece, a secondary cutting edge associated with the primary cutting edge, the secondary cutting edge being a wiper edge for axial machining of the work piece, wherein an intersection between the primary cutting edge and the secondary cutting edge of the second cutting insert is axially inwardly and radially outwardly offset from an intersection between the primary cutting edge and the secondary cutting edge of the first cutting insert, and a lead angle, the lead angle of each cutting insert defined between the primary and the secondary cutting is the same, a radial feed per tooth of the cutting tool with respect to the work piece obeying the inequality:

$$Fz \le d_r - \frac{d_a}{\tan(K_r)}.$$

where Fz is the radial feed per tooth;
dr is the radial offset between two consecutive offset cutting inserts;
da is the axial offset between two consecutive offset cutting inserts;
Kr is the lead angle of the cutting inserts.

11. A method according to claim 10, further comprising, before the step of face milling a step of choosing the work piece to be face milled, the work piece being chosen to be made of is a composite material.

12. A method according to claim 11, wherein in the step of choosing the work piece, the work piece is chosen to be made of composite material comprising a plurality of plies, the thickness of at least one ply to be machined during the step of face milling of the work piece being equal to the axial offset between two consecutive offset cutting inserts.

13. A method according to claim 12, wherein the radial feed per tooth is chosen about, but not more than, the optimum feed (Fzmax) according to the below equation:

$$Fz_{max} = d_r - \frac{p_{th}}{\tan(K_r)}.$$

where Fzmax is the optimum radial feed per tooth;
dr is the radial offset between two consecutive offset cutting inserts;
pth is the ply thickness of the composite material to be machined;
Kr is the lead angle of the cutting inserts.

* * * * *